(12) United States Patent
Ketonen et al.

(10) Patent No.: US 10,638,409 B2
(45) Date of Patent: Apr. 28, 2020

(54) WI-FI ROAMING MANAGEMENT

(71) Applicant: 7signal Solutions, Inc., Akron, OH (US)

(72) Inventors: Veli-Pekka Ketonen, Aurora, OH (US); Eric I. Camulli, Copley, OH (US); Jeffrey W. Reedy, Durham, NC (US)

(73) Assignee: 7signal Solutions, Inc., Aurora, OH (US)

( * ) Notice: Subject to any disclaimer, the term of this patent is extended or adjusted under 35 U.S.C. 154(b) by 12 days.

(21) Appl. No.: 15/600,681

(22) Filed: May 19, 2017

(65) Prior Publication Data

US 2018/0338278 A1 Nov. 22, 2018

(51) Int. Cl.
| | |
|---|---|
| *H04W 48/16* | (2009.01) |
| *H04W 48/18* | (2009.01) |
| *H04W 48/20* | (2009.01) |
| *H04W 88/06* | (2009.01) |
| *H04W 24/02* | (2009.01) |
| *H04W 8/18* | (2009.01) |
| *H04W 84/12* | (2009.01) |
| *H04W 36/36* | (2009.01) |
| *H04W 36/30* | (2009.01) |

(52) U.S. Cl.
CPC ........... *H04W 48/16* (2013.01); *H04W 48/18* (2013.01); *H04W 48/20* (2013.01); *H04W 8/18* (2013.01); *H04W 24/02* (2013.01); *H04W 36/30* (2013.01); *H04W 36/36* (2013.01); *H04W 84/12* (2013.01); *H04W 88/06* (2013.01)

(58) Field of Classification Search
CPC ..... H04W 48/18; H04W 24/02; H04W 36/30; H04W 36/36
See application file for complete search history.

(56) References Cited

U.S. PATENT DOCUMENTS

| | | | |
|---|---|---|---|
| 6,430,410 B1 | 8/2002 | Staber | |
| 2004/0209617 A1* | 10/2004 | Hrastar | H04W 24/00 455/434 |
| 2013/0301627 A1 | 11/2013 | Chen et al. | |
| 2013/0331118 A1* | 12/2013 | Chhabra | H04W 48/16 455/456.1 |
| 2015/0237511 A1* | 8/2015 | Jackson | H04W 24/02 455/423 |
| 2016/0330606 A1* | 11/2016 | Grenier-Raud | H04W 8/065 |
| 2017/0104647 A1* | 4/2017 | Chaiyochlarb | H04L 43/08 |
| 2017/0171833 A1* | 6/2017 | Vamaraju | H04W 60/04 |

FOREIGN PATENT DOCUMENTS

CN 106604314 A 4/2017

* cited by examiner

*Primary Examiner* — Jaime M Holliday
(74) *Attorney, Agent, or Firm* — Brian R. Galvin; Brian S. Boon; Galvin Patent Law LLC

(57) ABSTRACT

A system and method for Wi-Fi roaming management, comprising an agent application operating on a mobile device in background operation to monitor device state and operation and listen for notification events prompting a network action. Network actions may include performing network tests or disconnecting, reconnecting, or updating a network connection to ensure roaming is being handled properly and the device is connected to a desired access point.

18 Claims, 9 Drawing Sheets

WI-FI ROAMING MANAGEMENT

CROSS-REFERENCE TO RELATED APPLICATIONS

None.

BACKGROUND OF THE INVENTION

Field of the Art

The disclosure relates to the field of networking technology, and more particularly to the field of monitoring and directing roaming behavior across networks.

Discussion of the State of the Art

In the field of networking, devices often roam across multiple networks as their physical locations change, and this can have negative effects on network performance if roaming is not performed correctly. On mobile devices such as smartphones, a device may roam between Wi-Fi and cellular networks, as well as across a variety of cellular frequencies or carriers. When these roaming transitions fail, user experience is degraded or connectivity may be lost altogether until a connection is manually restored.

What is needed, is a way to manage network roaming behavior and identify a device persistently so it can be tracked across access points and networks, and so that the device can reconnect to the desired network or access point as it changes location.

SUMMARY OF THE INVENTION

Accordingly, the inventor has conceived and reduced to practice, in a preferred embodiment, a system and method for Wi-Fi roaming management.

The embodiments herein describe the use of an agent application operating on a mobile device in background operation to monitor device state and operation and listen for notification events prompting a network action. Network actions may include performing network tests or disconnecting, reconnecting, or updating a network connection to ensure roaming is being handled properly and the device is connected to a desired access point.

According to a preferred embodiment, a system for Wi-Fi roaming management, comprising: a roaming testing device comprising: a processor; a memory; a plurality of programming instructions stored in the memory and operating on the processor; a plurality of hardware network interfaces; wherein the programming instructions are configured to operate a client agent application that monitors at least a portion of the plurality of network interfaces to observe at least a roaming state, the roaming state comprising at least the SSID and signal information of a connection via the network interface; and wherein the client agent application is further configured to direct the operation of at least a portion of the network interfaces based at least in part on the roaming state, is disclosed.

According to a further aspect, the wireless test agent directs the wireless network interface to change its connection state based on instructions received from the central wireless testing server. According to a further aspect, the network state information comprises signal level information for the current connected access point and any other access points within range. In some aspects, the wireless test agent is further configured to: calculate a roaming metric based on a difference between the current signal level and a signal level of at least one other access point; and direct the wireless network interface to change its connection state based at least in part on the roaming metric.

According to a further aspect, the wireless test agent is further configured to test a plurality of network performance metrics before and after the wireless network interface changes its connection state. In some aspects, the plurality of network performance metrics tested comprises at least one of data rate, retransmission rate, and channel use information. In another aspect, the roaming testing device further comprises a plurality of hardware sensors, and the wireless test agent is configured to collect device state information comprising a plurality of sensor readings. In another aspect, the device state comprises information that determines whether the roaming testing device was in hand, in a pocket, or at a user's ear when roaming measurements were performed. In a further aspect, the plurality of hardware sensors comprises an accelerometer. In some aspects, accelerometer readings are used to compute a speed of the device relative to the earth. In another aspect, the wireless test agent determines if the roaming testing device has changed from one wireless network to another within a predetermined previous time period. In some aspects, the wireless test agent sends a plurality of pings to a network gateway and determines a roaming delay based on a timing gap between successive ping results. In an aspect, the wireless test agent ensures that the roaming testing device uses wireless access points within a specific region, and reports an error is the roaming testing device connects to an unauthorized wireless access point outside of the region. In another aspect, region names are used as a part of a BSSID naming scheme for wireless access points within the region, and BSSID name is used by the wireless test agent to determine whether a wireless access point is within the specific region. In a further aspect, the wireless test agent determines whether a transition by the roaming test device between a first wireless access point and a second wireless access point is authorized by using an allowed roaming list received from the central testing server. In an aspect, the roaming testing device is stationary and location information for the roaming testing device is provided to the wireless test agent by the test configuration server, and wherein location information is included by the wireless test agent in the test results sent to the central wireless testing server. In another aspect, roaming decisions are guided by comparing measured signal levels from several wireless access points to predetermined signal levels at a desired physical location where roaming should happen; wherein, when signal levels substantially match the predetermined levels, roaming is initiated by the wireless test agent.

According to another preferred embodiment, a method for Wi-Fi roaming management, comprising the steps of: detecting, at a client agent device, a change in device network operation; checking a plurality of known network connection information; determining whether a preferred network connection is in use; and if a preferred network connection is not in use, directing the operation of a hardware network interface to use the preferred network connection, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
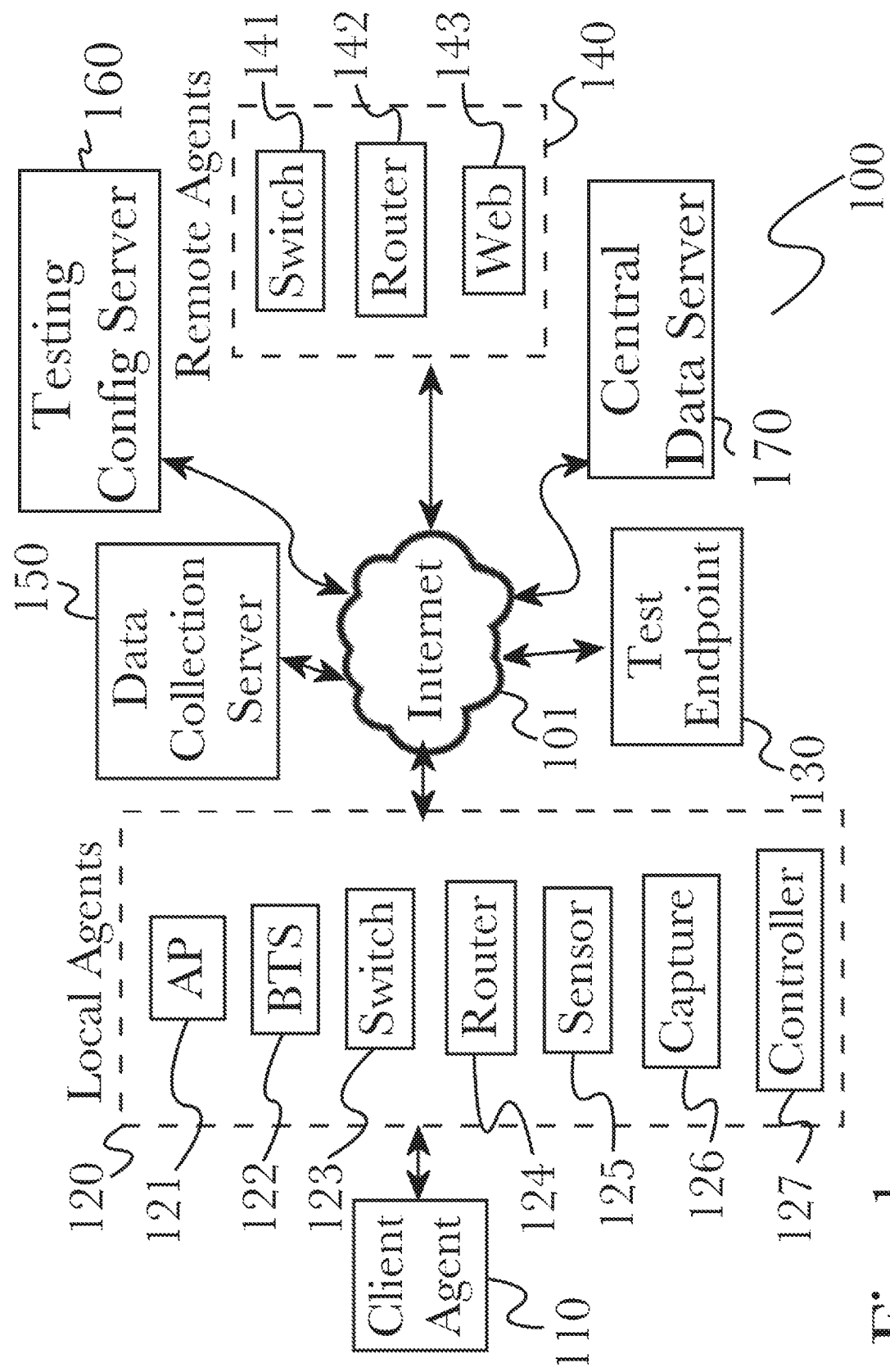
FIG. 1 is a block diagram illustrating an exemplary system architecture for Wi-Fi roaming management, according to a preferred embodiment.

The inventor has conceived, and reduced to practice, in a preferred embodiment, a system and method for advanced Wi-Fi performance monitoring, that utilizes background operation to test network performance during ideal times on a user's mobile device, and presents results in an easy-to-read single-page user interface for data viewing.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary system architecture 100 for Wi-Fi roaming management, according to a preferred embodiment. According to the embodiment, a client agent 110 may be a software application configured to run on any of a variety of computing devices such as a laptop personal computer, smartphone, tablet computing device, wearable computing device, or other such device types, and is configured to operate as a testing client during interactions with other agent applications via a network connection. Client agent 110 may communicate via a local network connection, such as a Wi-Fi local area network (LAN) to communicate with a variety of local agents 120, or the Internet 101 to communicate with remote agents 140 such as switch 141, router 142, web 143, or other agents operated by cloud-based service providers or on remote servers (for example, networking hardware operating at a remote location using a switch 141 or router agent 142 for purposes of testing, or a web server operating a web agent 143 accessible via the Internet, or other arrangements). A test endpoint agent 130 may be a personal computer or a server operated by a third-party (for example, a testing service offering the use of servers for purposes of the methods described below), which may be used to test end-to-end network performance between test endpoint 130 and client agent 110 as needed, according to the specific nature of a particular test being performed. A data collection server 150 may be used to collect testing data for use in crowdsourced information sharing (for example, to show results of tests performed by other client agents, or to form a heatmap or coverage map representation of aggregated testing results). A controller agent 127 may be used to provide remote triggering for test operations, for example by transmitting a push notification to a user's mobile device which is then received by a running test agent software application on the device (as described below, referring to FIG. 2). Various networking hardware may also be used in testing by running an agent application configured for that particular device or device type, for example a network access point (AP) 121, cell network base transceiver station (BTS) 122, switch 123 or router 124, that may be used to test performance between client agent 110 and the network hardware agent, which may be used to facilitate a variety of local tests that do not necessarily require an external connection to the Internet or an external server, or a sensor agent 125 the may be a dedicated hardware device operating an agent application, or a repurposed or recycled network device such as a router or switch that is no longer being used in its primary role. Data collection server 150 may store and provide test results for use, such as for presentation via the agent application operating on client agent 110, as well as to incorporate various historical test data into current or future tests. For example, a user may perform tests on two client agents 110, and each device may update its known test data using results from the other device's tests, enabling shared test data to form a more complete model of a network's performance. Similarly, while data collection server 150 may be used to collect test data, in some aspects a centralized wireless testing server 170 may be used to manage test execution in real time (for example, by receiving a request from a client agent 110 for a list of tests to perform, when client agent 110 detects that the network testing device on which it resides is idle), and for receiving test result data from a plurality of client agents 110 resident on a plurality of network testing devices 120. Furthermore, according to various aspects central wireless testing server 170 may compute operational parameters of various wireless or wired networks based on test results received from a plurality of client agents 110, and may direct one or more client agents 110 to carry out additional tests based on those operational parameters.

According to the embodiment, client agent 110 may operate in local memory and remain active silently while the host device is in use. This may be optionally in the foreground (that is, the application that a user is currently running on the main screen of their device, while it is otherwise being unused), or it may run in the background (that is, minimized or out of view while other software is being run or actions performed on the device), as a "hotspot helper" application. While operating as a hotspot helper, client agent 110 may monitor network properties such as signal strength and SSID or other AP information, and may utilize a device's notification service to trigger tests and other actions, utilizing existing background notification functionality common in mobile devices. Generally, this functionality is used to provide small amounts of data to applications that need frequent updating, such as news readers or email clients, but by utilizing this notification service the agent application can remain in the background of a device with minimal usage of system resources, and when a notification event is received (for example, from a hotspot helper triggering a notification event in response to changes in network properties, or as a generated event such as by a time-based or usage-based configuration) the application then "wakes up", processing the event and performing test actions if appropriate. For example, client agent 110 may monitor device usage while in the background, such as by receiving sensor data from hardware sensors 112 (for example, accelerometer or geolocation data) or by monitoring system resource load (such as CPU or memory usage) to determine when a device is not being actively used. When a device is not in use, a notification event may be produced to wake up the agent app, using minimal system resources to perform a small task such to execute a network test action and log the results. These logged results may then be viewed later as a user-friendly single-page interface, that may comprise the foreground screen of the agent app (that is, when a user is running the agent in the foreground, they always see the readout of test results, and no interaction or modification is required).

Agent-driven roaming behavior may be used to direct a host device running a client agent 110 to connect to a specified preferred network (or optionally, to check a list of preferred networks and connect to the "most-preferred" one currently available), or to use a specific carrier, frequency, network type, channel, or other network property. It may also be used to detect when the host device may be on the correct network, but connected to a sub-optimal AP, for example in a large network with many APs, the device may stay connected to the same one even as it moves around, despite availability of a more appropriate AP such as one that is physically closer or has other desirable characteristics. Network tests performed by client agent 110 may detect this condition by examining radio line-of-sight (LOS) and checking signal strength and location information for APs, detecting when an AP is available that would provide improved performance and then notifying the user or automatically updating the device connection information.

A variety of test actions and test types are possible according to the embodiment, according to various network and device configurations or capabilities, or the configuration of the agent application, or the contents of a particular notification event. Tests may be performed using various combinations of network-connected devices, for example between mobile device 110 and router 124, test endpoint 130, or another mobile device 110 such as to test performance between two client devices on the same network, or to perform more advanced test actions using (for example) a smartphone and a personal computer. Test actions may include (but are not limited to) basic network testing such as packet transmission to test packet loss or travel time, upload and download performance statistics, payload-based throughput tests, voice quality testing for voice over internet protocol (VoIP) applications, or packet capture that may involve a capture agent 126 that operates as a "tap" on a network connection, listening to and capturing sent packets from client agent 110 and returning test results after completion (this may be used to check packet integrity or detailed packet loss statistics, for example), or sensor-based tests such as using a smartphone's hardware sensors to select and perform test actions (for example, picking a specific cellular radio band to use based on device hardware measurements). Geolocation information may be used to map network access points (APs) such as routers, modems, or cell towers, and this location information may be used to identify and select APs during tests and in test reporting, for example by including coordinates or human-readable location names in test data alongside other test information such as radio channels, bands, or signal strength, or the location of the client agent 110 when the test was performed (as may be derived from onboard hardware sensors). This may also be used in the selection of test actions to perform, such as to select an AP or a wireless band based on known location or distance, for example to confirm whether real network performance matches what is expected given the location of the AP relative to the agent. In a mobile device that may have multiple network connection interfaces (for example, Wi-Fi and cellular radios), one interface may be used for testing while another remains active for other device operations, enabling an otherwise unused interface to be used to monitor performance in the background as the device continues normal operation. Additionally, performance readings may be compared across multiple interfaces, channels, bands, or frequencies to increase granularity of test result data, according to a testing protocol. Another use may be to measure dynamic frequency scaling (DFS) events, checking for radar signals and automatically determining how to optimize network setup around possible radar activity by monitoring DFS channel activity and utilizing these (ordinarily unused) channels when possible.

Roaming decisions may be guided by the calculation of a roaming metric, that may be based on recorded values or test results for signal levels both for a currently-connected AP and a plurality of additional APs within range. This may be used to determine the best-fit AP to which to connect, and direct roaming behavior accordingly. Tests may be performed on various network metrics such as (for example, including but not limited to) ping, jitter, packet loss, upload or download bandwidth, channel interference or other network noise or interference, or other network statistics. These metrics may then be used when making a roaming decision, to improve network performance by adapting to changing network conditions. Tests may be performed again after changing network connection state, to confirm whether an improvement occurred or to determine whether additional connection changes are needed.

Hardware sensors may be used to collect device information for use when making roaming decisions or to enhance test results, such as to monitor device orientation, location, or movement velocity. This may also be used to enhance roaming decisions by using device location or movement information to select an AP from a list of known APs with location information, for example to direct device roaming behavior when moving around within a building. This may be further enhanced by associating multiple APs into groups based on their location information, for example to maintain a logical model of APs within a building, grouped into floors or rooms. As a device moves about, it may direct its network roaming state according to its location within the building to maintain connectivity to the best AP based on its location. This may also be used to determine "allowed" roaming state transitions, for example a device may not allow transitioning from one AP to another because they are on different floors, even though network tests may indicate that the forbidden AP is preferable at the moment. For example, if a user is standing in the room directly below the AP, the signal may be excellent in that spot but deteriorate rapidly due to the floor separation, whereas an AP on the user's floor may appear to have lower signal in that room, but remain much more consistent as they move around the floor.

Detailed Description of Exemplary Embodiments

Figure 2:
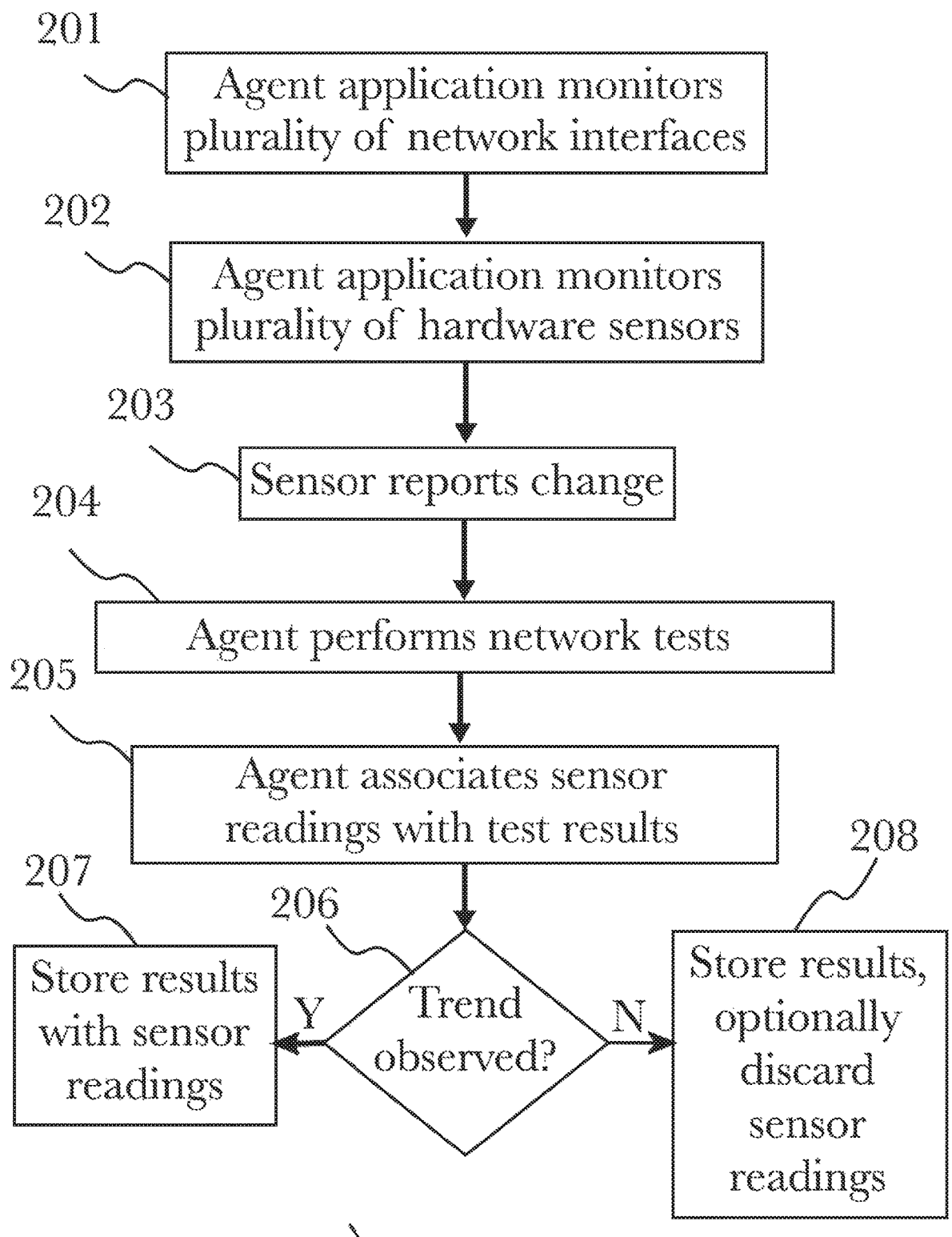
FIG. 2 is a flow diagram illustrating an exemplary method for Wi-Fi roaming management, illustrating an overview process for testing network performance in motion, according to a preferred embodiment.

FIG. 2 is a flow diagram illustrating an exemplary method 200 for Wi-Fi roaming management, illustrating an overview process for testing network performance in motion, according to a preferred embodiment. In an initial step 201, a client agent 110 may monitor a plurality of network interfaces 111 on a host device 101, such as Wi-Fi or cellular modems in a smartphone. According to various arrangements, client agent 110 may monitor a single interface or may monitor multiple interfaces simultaneously, for example to monitor performance on various Wi-Fi channels or on various cellular radio frequency bands. Additionally, the interfaces being monitored may optionally be in use, such as monitoring performance on a Wi-Fi network to which the host device is currently connected, or they may be unused interfaces such as secondary Wi-Fi interfaces, or interfaces that are in a temporary dormant state such as in a smartphone that is connected via Wi-Fi and has put a cellular radio to sleep to conserve battery power.

In a next step 202, client agent 110 may monitor a plurality of available hardware sensors 112, such as (for example, including but not limited to) an accelerometer, gyroscope, or geolocation sensor such as GPS or GLONASS (as are commonly utilized in smartphones and other mobile devices). Changes in sensors 112 may be detected 203, indicating a change in device orientation or position, and client agent 110 may then perform any of a variety of network tests 204 to examine the network performance on any or all of the monitored interfaces. Upon completion, test results may be associated with sensor readings 205 to check for patterns 206, such as identifying a consistent change in network performance based on a device's orientation. If such a trend is observed, it may be stored 207 with a plurality of sensor reading information to correlate network performance and device sensor information, or if no such pattern emerges the network tests may be simply stored normally 208 to conserve space (discarding irrelevant sensor reading information). Stored results may be used in a variety of ways, such as to provide enhanced notifications to users wherein a roaming status notification may include known network or sensor data from historical device measurements (optionally either from that user's device, or from multiple users in a crowdsourced data collection arrangement), or to build a representative model for network coverage or performance using collected data from many users over time. This sensor-driven test and comparison technique may be used to determine if changes in device orientation affect signal quality or other network performance metrics, or to examine how device movement affects network performance. For example, by running a number of tests periodically while a device is in motion, it is possible to examine whether device velocity affects network performance, possibly independently of device orientation or position. By utilizing multiple sensor readings and network tests, various combinations of sensor changes and network performance results can be examined individually as well as compared against one another to identify any patterns or correlations, such as (for example) to see if device orientation affects signal strength, while checking separately to see if device velocity affects network performance, or checking to see if device position affects performance within a wide-area network (WAN) independently of movement, or any other such comparisons.

Figure 3:
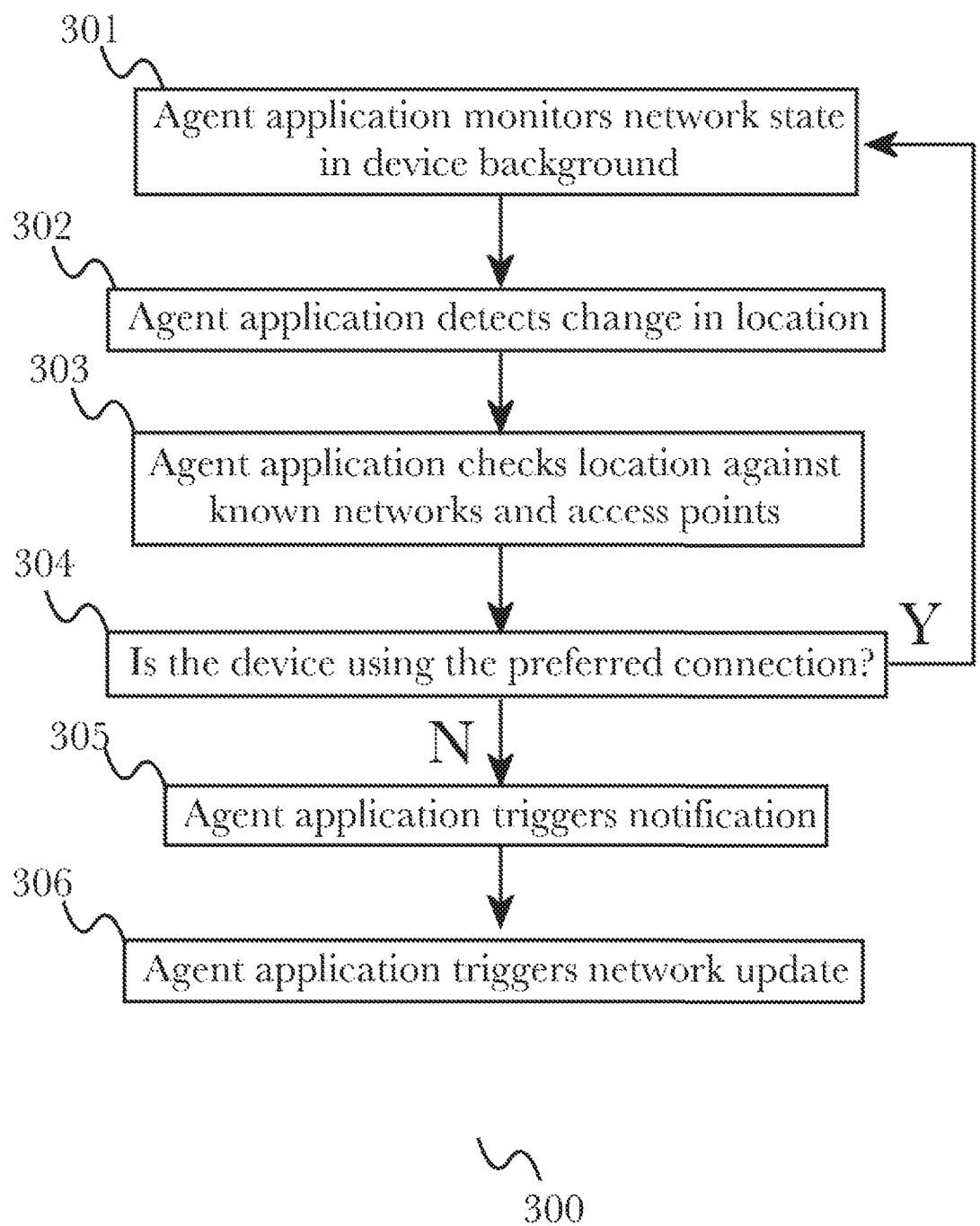
FIG. 3 is a flow diagram illustrating an exemplary method for Wi-Fi roaming management, illustrating a process for managing a device's roaming behavior through the use of a software agent application, according to a preferred embodiment.

FIG. 3 is a flow diagram illustrating an exemplary method 300 for Wi-Fi roaming management, illustrating a process for managing a device's roaming behavior through the use of a software agent application, according to a preferred embodiment. In an initial step 301, a software agent application may run in the background of a mobile device 110 and monitor network connections and activity. This may be used to monitor specific networks and APs to which mobile device 110 is connected, as well as network performance such as upload or download speeds or response times. While running the in the background, the agent application may detect 302 changes in device location (or other sensor information), which may be used along with the network monitoring to check against known network or APs 303, to determine whether mobile device 110 is connected to the preferred network or AP 304, for example based on known AP locations or capabilities (for example, if an AP is nearby that supports a higher-speed connection type or that has less current traffic load). If the mobile device 110 is connected to the best connection, no changes are made and the agent continues monitoring in the background. However, if the mobile device 110 is not connected to the best connection, the agent application may then trigger a notification 305, such as a silent action using a notification service in the operating system of the mobile device 110, or a pop-up notification presented to a user on the screen of mobile device 110, or a notification message transmitted over a network to a web server 120 such as to report the network or location status. The agent application may then trigger a network connection update 306, directing mobile device 110 to update a network connection to use the preferred connection, before resuming background operation. In this manner, the roaming behavior of a mobile device 110 may be monitored and directed, ensuring that it connects to the proper networks and APs automatically without requiring a user to manually configure network connections or hardware settings on their device.

Figure 8:
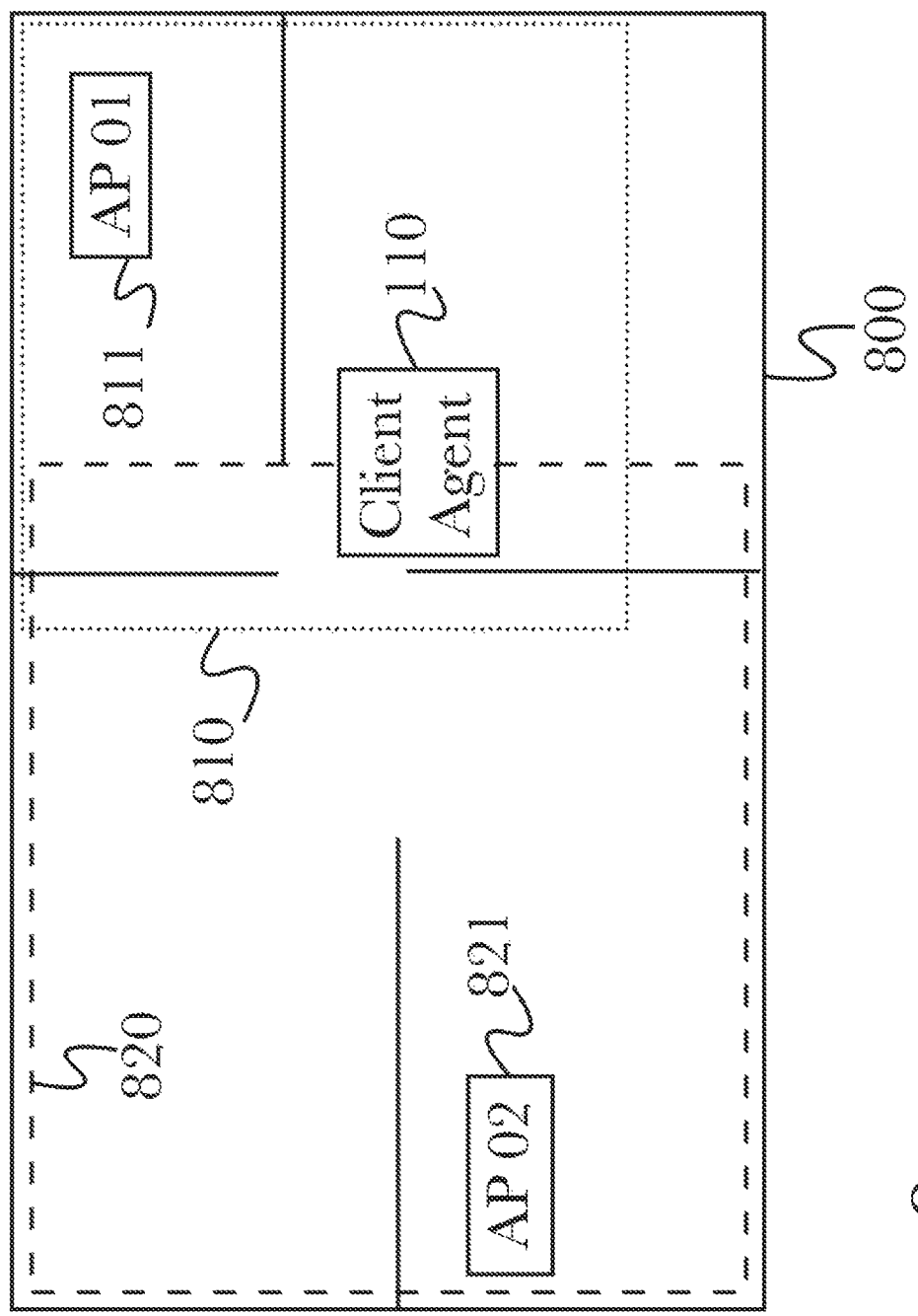
FIG. 8 is a block diagram illustrating the use of Wi-Fi roaming management while a device moves between network zones.

FIG. 8 is a block diagram illustrating the use of Wi-Fi roaming management while a device moves between network zones. According to the embodiment, a client agent 110 operating on a device such as a smartphone or a personal computer (for example, either using an integrated network interface or using a luggable network adapter) may monitor device network connections to Wi-Fi networks or zones within a single network (such as in a network with multiple APs, for example in a mesh network) to monitor roaming behavior of the host device as it moves around. Client agent 110 can perform a variety of tests with an agent application running on an AP 811, 821, such as packet loss, response time, bandwidth, or other performance tests, and tests may be performed and retried while client agent 110 moves around within and between network zones 810, 820 to examine the changes in test results. AP location information can be incorporated into results, allowing a location-based map or other representation to be formed from test results and determine network optimization information for floor 800. Based on network test results, location information, device sensor information, and preconfigured roaming behavior preferences (for example, a client agent 110 may be configured to avoid certain APs, even though they may return favorable network test results), client agent 110 may direct the host device to update its network connection to use a preferable AP or connection configuration, such as to direct the host device to connect to the fastest AP available, or to connect to an AP that is closer based on device movement (as may be measured with a variety of device sensors, described above in FIG. 2).

Figure 9:
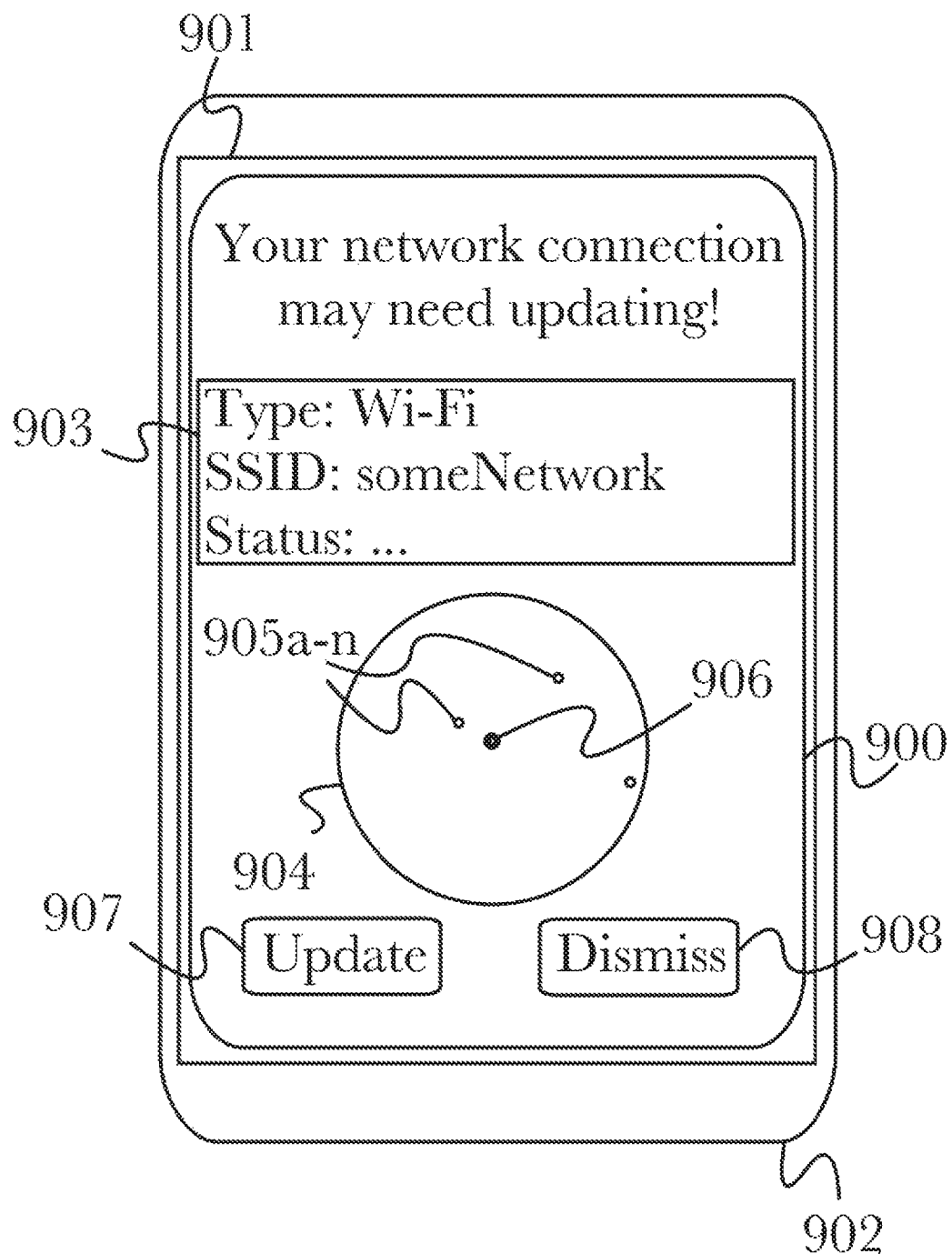
FIG. 9 is a block diagram of an exemplary user interface for presenting a roaming notification on the screen of a user's mobile device.

FIG. 9 is a block diagram of an exemplary user interface for presenting a roaming notification 900 on the screen 901 of a user's mobile device 902. A roaming notification 900 may be presented when a client agent 110 application operating on a user's device 902 detects an issue with the device's roaming state, for example if the device's network settings are not being updated properly to automatically use the best AP within range, or to connect to a preferred network based on stored network configuration or known location information, or other network connection issues. Within a roaming notification 900, a variety of network information 903 may be presented to inform a user of their current configuration and potentially alert them to any issues that were detected, for example showing the connection type (such as Wi-Fi or cellular, for example), the SSID of the currently-connected AP, connection test results such as download speed or packet loss ratio, or other network information. A map may optionally be shown 904, indicating nearby AP locations 905a-n relative to the user's location 906, for example when AP location information is available as described previously. The notification 900 may also present a user with one-click options to update 907 their network configuration to enforce preferred roaming behavior, or to dismiss 908 the notification with no action, if they wish to leave the network settings as-is.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 4:
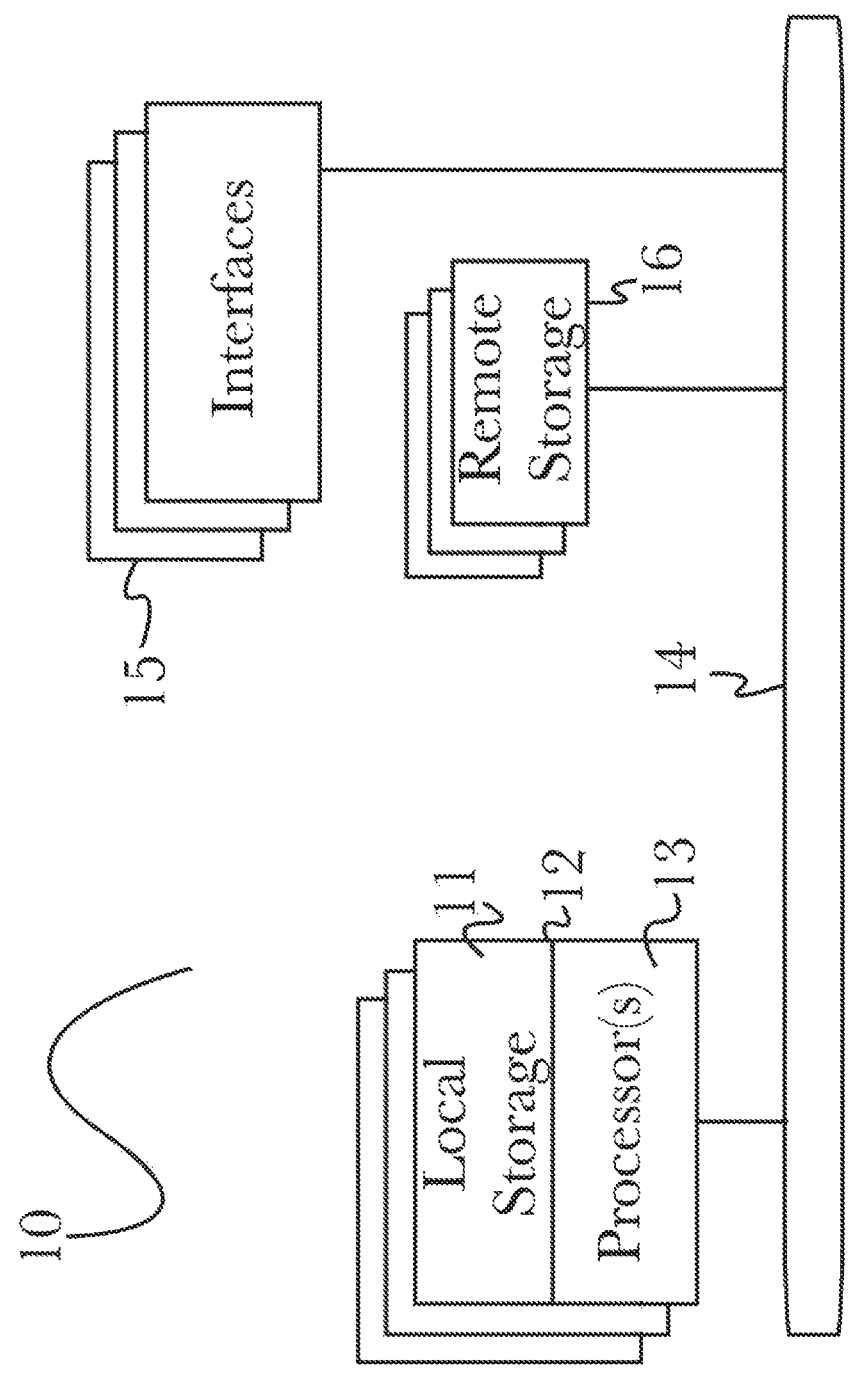
FIG. 4 is a block diagram illustrating an exemplary hardware architecture of a computing device used in an embodiment.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
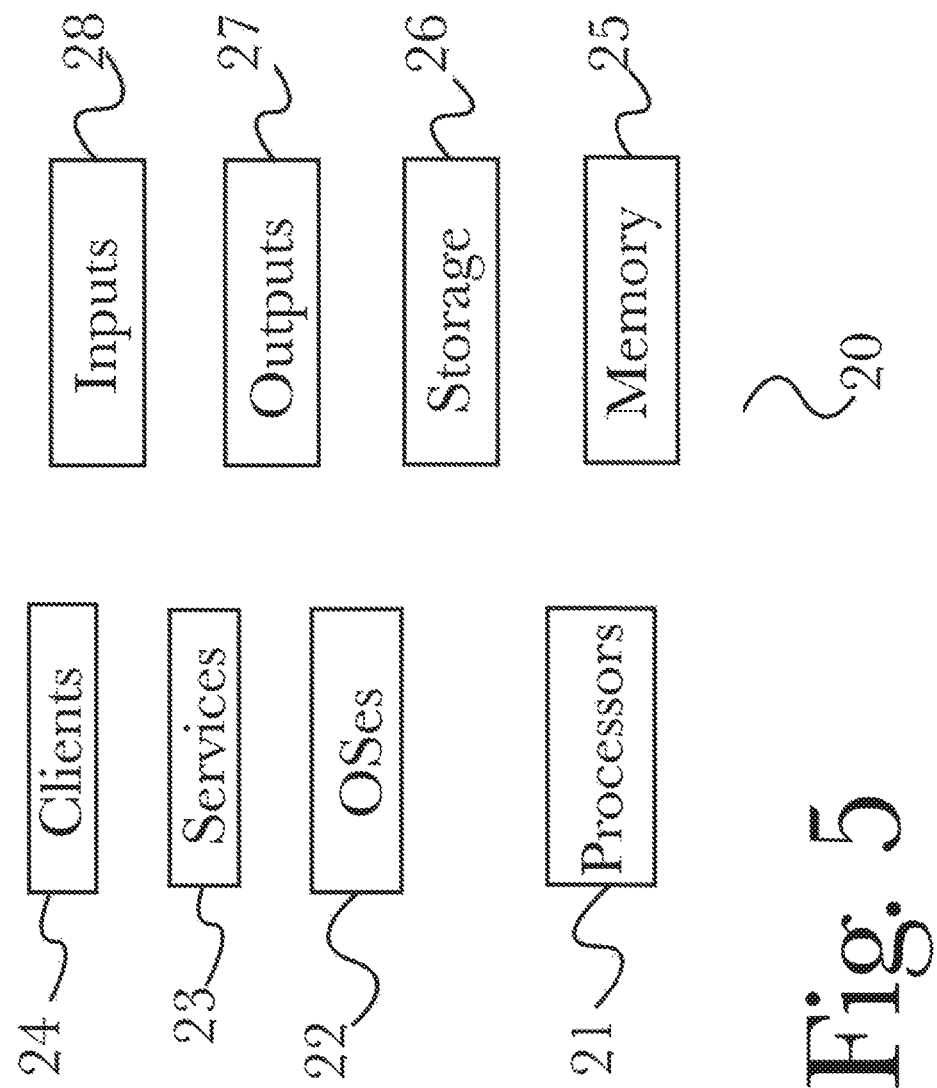
FIG. 5 is a block diagram illustrating an exemplary logical architecture for a client device, according to an embodiment.

In some embodiments, systems according to the present invention may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
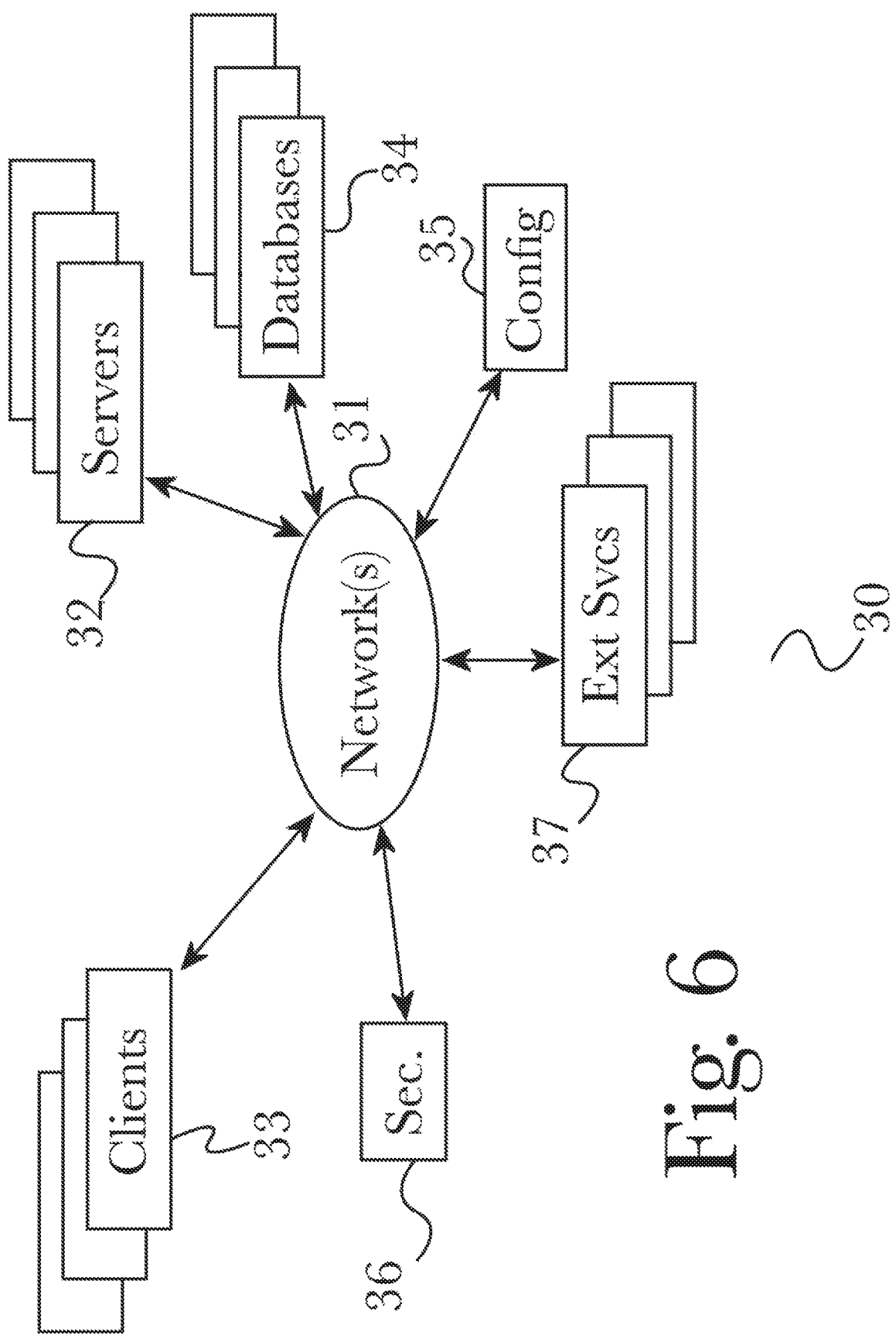
FIG. 6 is a block diagram showing an exemplary architectural arrangement of clients, servers, and external services, according to an embodiment.

In some embodiments, systems of the present invention may be implemented on a distributed computing network, such as one having any number of clients and/or servers. Referring now to FIG. 6, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 5. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 7:
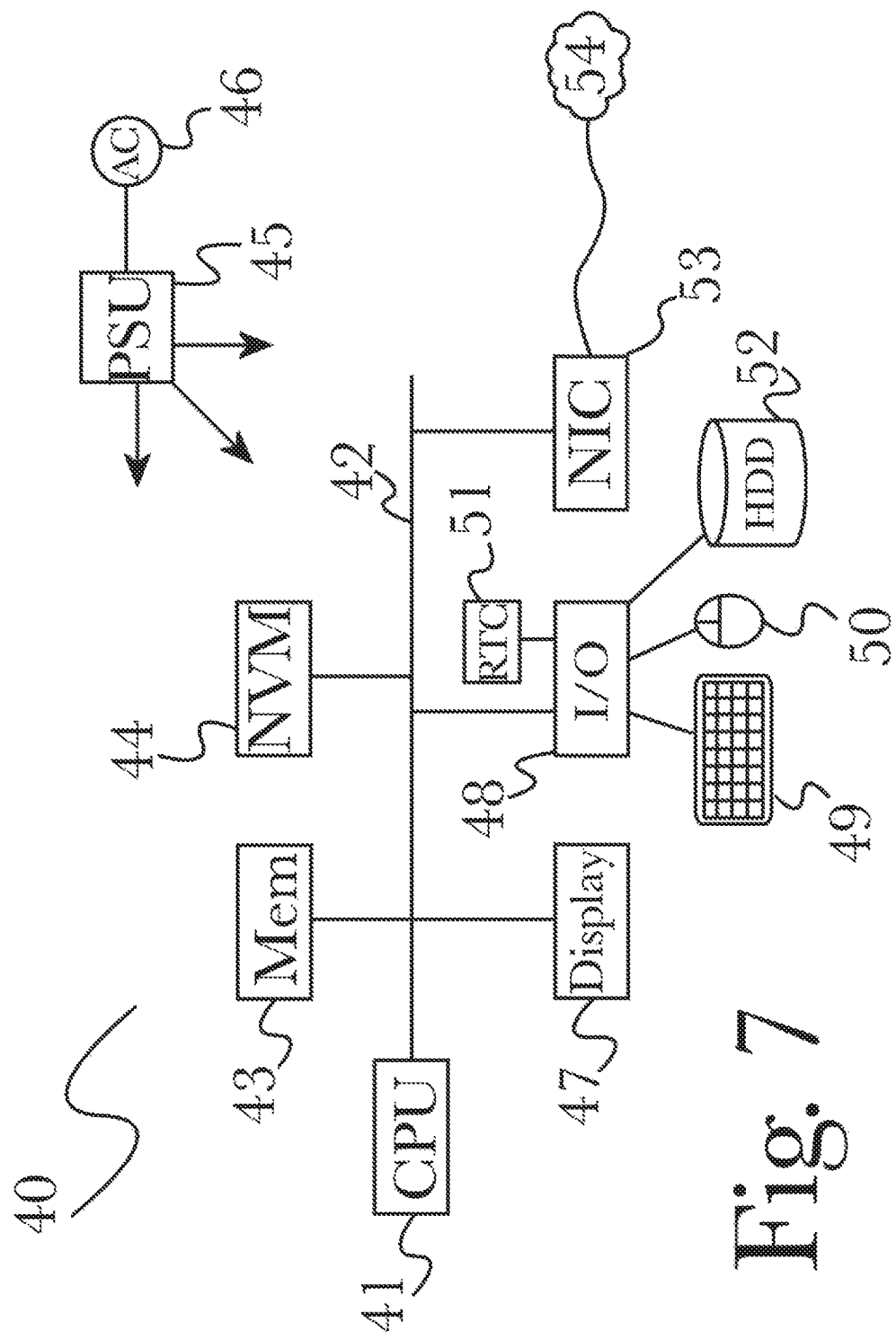
FIG. 7 is another block diagram illustrating an exemplary hardware architecture of a computing device used in various embodiments.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for Wi-Fi roaming management, comprising:
a network testing device comprising a processor, a memory, a first wireless network interface, a global positioning system (GPS) receiver, and a plurality of programming instructions stored in the memory and operating on the processor, wherein the programming instructions, when operating on the processor, cause the network testing device to:
detect available wireless networks;
for each available wireless network detected, determine at least a signal set identifier (SSID), a signal strength, and a location of the available wireless network by contacting a network location service using a current wireless network connection;
determine a location of the network testing device and a direction of motion of the network testing device using the global positioning system receiver;
estimate a data throughput between the network testing device and the current wireless network connection by passively collecting and analyzing data packets received by the network testing device from the current wireless network connection;
when the estimated data throughput is below an expected threshold value:
determine which of the available wireless networks are located in the direction of motion of the network testing device; and
test one or more of the available wireless networks determined to be in the direction of motion of the network testing device by sending a first data stream over the available wireless network to a central wireless testing server, receiving a second data stream from the central wireless testing server from over the available wireless network, and determining a throughput between the network testing device and the available wireless network; and
when at least one of the available wireless networks determined to be in the direction of motion of the network testing device has a higher throughput than the current wireless network connection, direct the wireless network interface to change the current network connection to the available wireless network with the highest tested throughput.

2. The system of claim 1, wherein the network testing device directs the wireless network interface to change its connection based on instructions received from the central wireless testing server.

3. The system of claim 1, wherein the network testing device is further configured to:
calculate a roaming metric based on a difference between the current signal level and a signal level of at least one other access point; and
direct the wireless network interface to change its connection state based at least in part on the roaming metric.

4. The system of claim 3, wherein the network testing device is further configured to test a plurality of network performance metrics before and after the wireless network interface changes its connection.

5. The system of claim 4, wherein the plurality of network performance metrics tested comprises at least one of data rate, retransmission rate, and channel use information.

6. The system of claim 1, wherein the network testing device further comprises a plurality of hardware sensors, and the wireless test agent is configured to collect device state information comprising a plurality of sensor readings.

7. The system of claim 6, wherein the device state comprises information that determines whether the roaming testing device was in hand, in a pocket, or at a user's ear when roaming measurements were performed.

8. The system of claim 6, wherein the plurality of hardware sensors comprises an accelerometer.

9. The device of claim 8, wherein accelerometer readings are used to compute a speed of the device relative to the earth.

10. The system of claim 1, wherein the network testing device determines if the network testing device has changed from one wireless network to another within a predetermined previous time period.

11. The system of claim 1, wherein the network testing device sends a plurality of pings to a network gateway and determines a roaming delay based on a timing gap between successive ping results.

12. The system of claim 1, wherein the network testing device ensures that the network testing device uses wireless access points within a specific region, and reports an error if the network testing device connects to an unauthorized wireless access point outside of the region.

13. The system of claim 12, wherein region names are used as a part of a BSSID naming scheme for wireless access points within the region, and BSSID name is used by the network testing device to determine whether a wireless access point is within the specific region.

14. The system of claim 1, wherein the network testing device determines whether a transition by the network test device between a first wireless access point and a second wireless access point is authorized by using an allowed roaming list received from the central testing server.

15. The system of claim 1, wherein the network testing device is stationary and location information for the network testing device is provided to the wireless test agent by the test configuration server, and wherein location information is included by the wireless test agent in the test results sent to the central wireless testing server.

16. The system of claim 1, wherein roaming decisions are guided by comparing measured signal levels from several wireless access points to predetermined signal levels at a desired physical location where roaming should happen; wherein, when signal levels substantially match the predetermined levels, roaming is initiated by the network testing device.

17. A method for Wi-Fi roaming management, comprising the steps of:
   detecting available wireless networks using a network testing device comprising a processor, a memory, a first wireless network interface, a global positioning system (GPS) receiver, and a plurality of programming instructions stored in the memory and operating on the processor;
   for each available wireless network detected, determining at least a signal set identifier (SSID), a signal strength, and a location of the available wireless network by contacting a network location service using a current wireless network connection;
   determining a location of the network testing device and a direction of motion of the network testing device using the global positioning system receiver;
   estimating a data throughput between the network testing device and the current wireless network connection by passively collecting and analyzing data packets received by the network testing device from the current wireless network connection;
   when the estimated data throughput is below an expected threshold value:
      determining which of the available wireless networks are located in the direction of motion of the network testing device; and
      testing one or more of the available wireless networks determined to be in the direction of motion of the network testing device by sending a first data stream over the available wireless network to a central wireless testing server, receiving a second data stream from the central wireless testing server from over the available wireless network, and determining a throughput between the network testing device and the available wireless network; and
   when at least one of the available wireless networks determined to be in the direction of motion of the network testing device has a higher throughput than the current wireless network connection, changing the current network connection to the available wireless network with the highest tested throughput.

18. The method of claim 17, wherein the network testing device directs the wireless network interface to change its connection state based on instructions received from the central wireless testing server.

* * * * *